(No Model.)  3 Sheets—Sheet 1.
E. W. STRAIN.
APPARATUS FOR REDUCING, REFINING, AND SEPARATING HYDROCARBON OILS.
No. 298,712. Patented May 13, 1884.
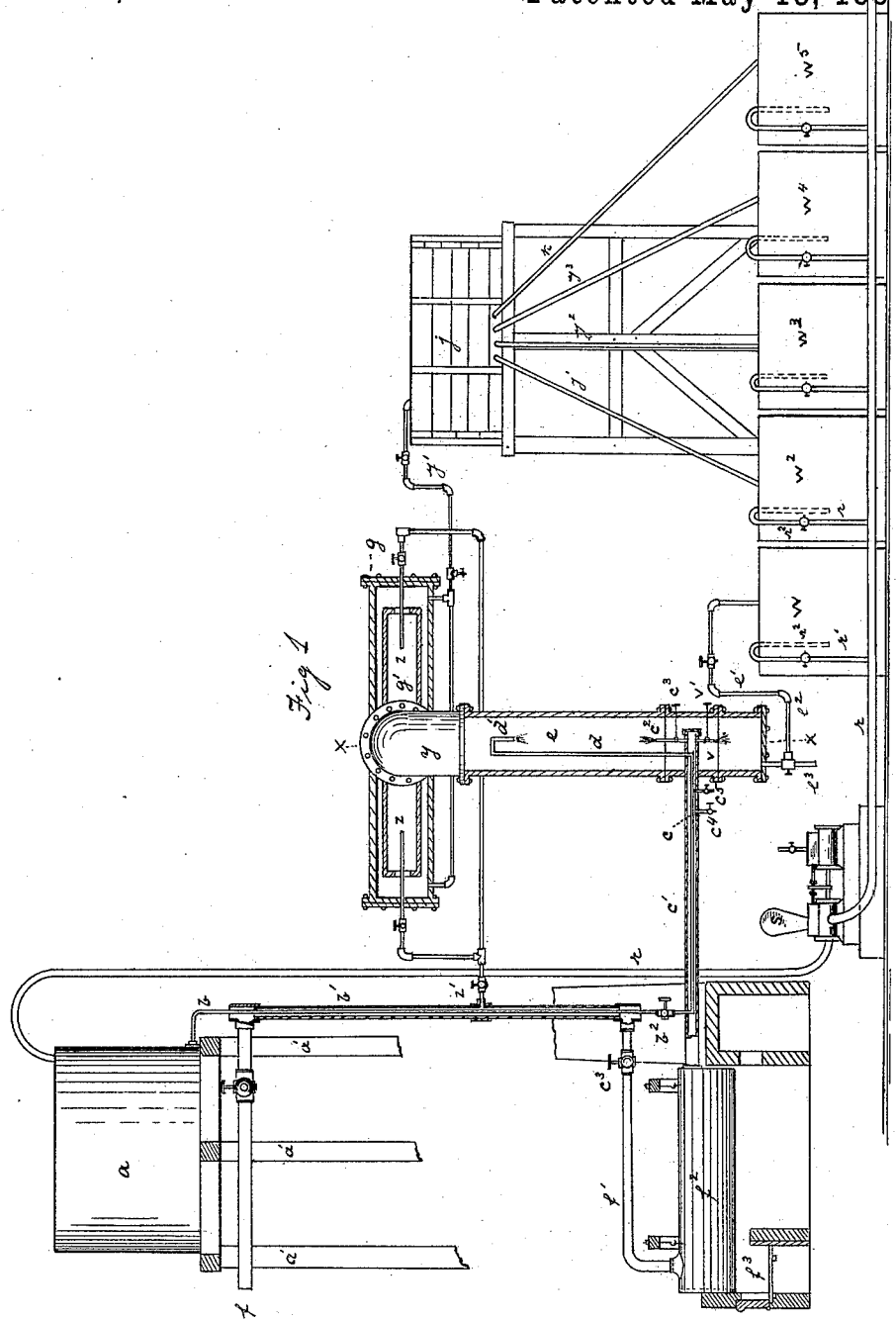
Witnesses
Jm. K. Smith
R. C. Golden
Inventor
Ebenezer W. Strain
by his attorneys
Bakewell & Kerr (No Model.)
3 Sheets—Sheet 2.
E. W. STRAIN.
APPARATUS FOR REDUCING, REFINING, AND SEPARATING HYDROCARBON OILS.
No. 298,712. Patented May 13, 1884.
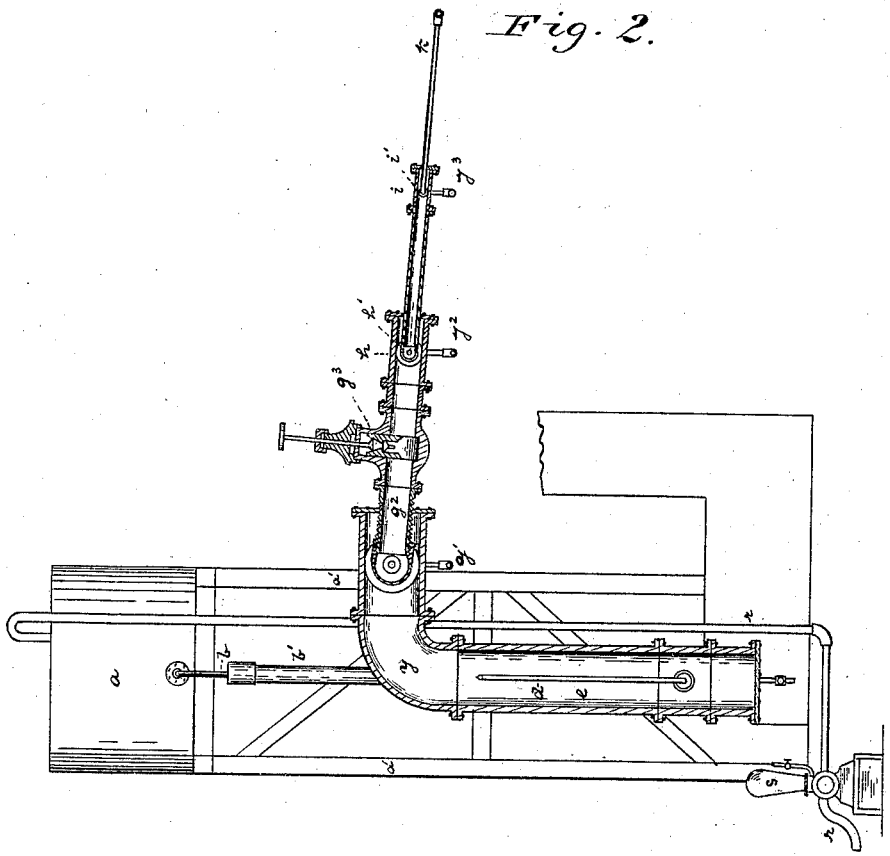

(No Model.)
3 Sheets—Sheet 3.
E. W. STRAIN.
APPARATUS FOR REDUCING, REFINING, AND SEPARATING HYDROCARBON OILS.
No. 298,712.
Patented May 13, 1884.
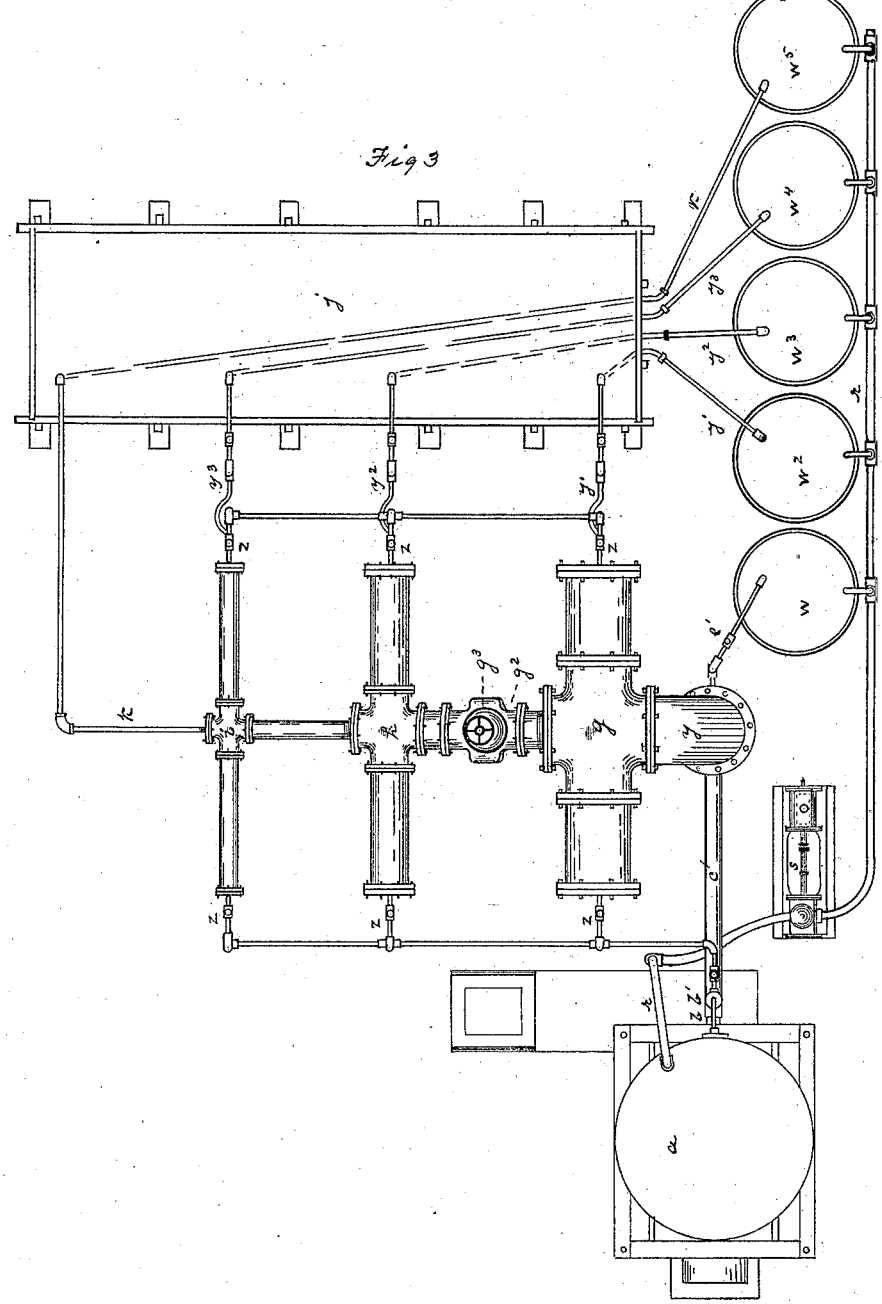

UNITED STATES PATENT OFFICE.

EBENEZER W. STRAIN, OF ALLEGHENY, PENNSYLVANIA.

APPARATUS FOR REDUCING, REFINING, AND SEPARATING HYDROCARBON OILS.

SPECIFICATION forming part of Letters Patent No. 298,712, dated May 13, 1884.

Application filed October 18, 1883. (No model.)

*To all whom it may concern:*

Be it known that I, EBENEZER W. STRAIN, of the city of Allegheny, in the county of Allegheny and State of Pennsylvania, have invented a new and useful Improvement in Apparatus for Reducing, Refining, and Separating Hydrocarbon Oils; and I do hereby declare the following to be a full, clear, and exact description thereof.

My invention relates to an improvement in apparatus for refining, reducing, and separating oils; and it has for its object the arrangement and construction of devices for reducing the oil, while in a state of transit, by the elimination of the gases and lighter oils, for refining the oil by the separation of foreign and injurious matter, and for the separation of the oils of different degrees of specific gravity from each other.

I will now describe my invention so that others skilled in the art to which it appertains may manufacture and use the same, reference being had to the accompanying drawings, forming part of this specification, in which—

Figure 1 is a side elevation of my improved apparatus, partially in section. Fig. 2 is a front elevation, partially in section, on the line $x\ x$, Fig. 1; and Fig. 3 is a plan view of the same.

Like letters of reference indicate like parts wherever they occur.

The devices which constitute my improved apparatus are an elevated supply-tank, a reducing-chamber for the vaporization of the lighter oils and gases, a separator for dividing the vaporized oils according to their degree of specific gravity, a condenser for condensing the vaporized oils, traps arranged in the conduit-pipes for the purpose of the separation of foreign and deleterious matter from the oil, and devices for heating the oil on its passage from the supply-tank to the reducer, as will hereinafter more fully appear, the same being a modification of apparatus forming the subject-matter of a separate application of even date herewith, Serial No. 109,347.

In the drawings, A represents the oil-supply tank elevated above the reducer and separator and supported by the standards A'. Leading down from the bottom of the tank A is a supply-pipe, B, which is surrounded by a steam-jacket, B', and extends to and communicates with a horizontal pipe, C, which is surrounded by a steam-jacket, C'. This pipe C at its other end communicates with a pipe, D, which extends vertically upward through and to the upper portion of the reducer E, where it communicates with the spray-pipe D', which opens downward, so as to spray the oil down from the top toward the bottom of the reducer. This reducer is cylindrical in form, and is placed in a vertical position below the level of the top of the tank A. A steam-pipe, F, leading from a steam-boiler or other steam-generator, enters the steam-jacket B', and by a branch pipe, F', communicates with the superheater F'', which is arranged over a furnace, F''', and communicates with the steam-jacket C'. Extending upward from the other end of the steam-jacket C', through the bottom of the reducer E, is a steam jet or spray pipe, C'', which is arranged to discharge steam from the steam-jacket upward in the reducer. Another and similar steam spray-pipe, V, is arranged in the reducer, so as to spray steam from the steam-jacket toward the bottom of the reducer. A stop-cock, C''', is fitted in the pipe $f'$, the purpose of which is to regulate the supply of steam. Stop-cocks $C^3$, B'', and V' are also placed in the pipes B and V for regulating the flow of steam and oil. Extending from the jacket C' and pipe C are gage-cocks C'''' and C''''', the purpose of which is to enable the temperature of the steam and oil as they pass to the reducer to be ascertained by a thermometer. Leading from the bottom of the reducer E is a pipe, E', which extends to and opens into a tank or receiver, W. Between the tank and reducer the pipe E' is bent so as to form the trap E'', at the bottom of which trap is a gage-cock, E''', the purpose of which is to enable the trap to be cleared of paraffine, tar, and other foreign matter or sediment.

The separator, which differs essentially in construction from the separator described in the application before referred to, although the principle of the operation is the same, is composed of a series of horizontal cylindrical pipes, G, H, and I, interior smaller cylindrical pipes, G', H', and I', placed inside of the larger cylinders, and trap-conduit pipes Y', Y'', Y''', leading from the cylinders to separate receiving-tanks. Leading from the top of the reducer E is an elbow-pipe, Y, which opens into the horizontal cylinder G at a point equally distant from the two ends and at right angles to the line of the axis thereof. Inside of the cylinder G is a smaller cylindrical pipe, G', open at its ends. Extending from this pipe G' on a line with the elbow-pipe Y. Through the shell of the cylinder G is a cylindrical pipe, G'', which opens into the next cylinder, H, as already described in the case of the elbow-pipe Y. In the pipe $g^2$ is a gate-valve, $g^3$, by which the flow of oil-vapor is regulated. Inside of the cylinder H is a smaller cylindrical pipe, H', open at its ends, and having a pipe leading through the shell of the cylinder H to the next cylinder, I. This cylinder I also has an interior smaller cylindrical pipe, I', open at its ends, and from which a pipe, K, leads through the shell of the cylinder I to a receiving-tank. Opening from the bottom of the cylinders G, H, and I, at the ends thereof, are trap-pipes Y' Y'' Y''', each of which is provided with a gage-cock, for the purpose of cleaning the trap. These trap-pipes lead through a cooler and condenser, J, to receiving-tanks $W^2$ $W^3$ $W^4$, while the pipe K leads through the condenser J to the tank $W^5$. Extending into the pipes G', H', and I', through the open ends thereof, are steam-jet pipes Z, which communicate with a steam-pipe, Z', leading from the steam-jacket B'. Each cylinder of the series and their interior pipes are less in diameter, and are on a slightly lower level than the preceding cylinder and pipe.

Instead of the separator being formed, as described, of a series of T-shaped pipes, L-shaped pipes may be employed, the interior pipes being open only at their outer end.

The cooler and condenser J, which is supported on standards above the receiving-tanks, is filled with water, so as to cool the oil and condense the gases, which pass off from the separator and reducer. Extending from the bottom of the receiving-tanks are pipes R', having a valve or stop-cock, R'', and opening into the main pipe R, which leads to the pump S, and thence from the pump to the tank A.

The operation is as follows: The oil to be reduced, refined, and separated, either crude petroleum or a distillate thereof, is fed into the tank A, from which it descends through the pipe B, where it is heated by the steam in the jacket B', into the pipe C, where it is still further heated by the superheated steam in the steam-jacket C', through the pipe D, and is sprayed downward from the sprayer D' in the reducer, where it meets the ascending spray or jet of superheated steam from the steam-sprayer C''. The oil having been heated before it enters the reducer, and being further heated by the jets of steam in the reducer, the lighter oils are vaporized, and, together with the fixed gases, rise to the top of the reducer, while the reduced or heavy oil, free from the lighter hydrocarbons, falls to the bottom of the reducer and passes thence through the trap-pipe E' into the receiving-tank W. The jet of steam from the pipe V prevents the trap from being clogged by paraffine or tar, which is contained in the crude petroleum. The vaporized lighter oils which rise to the top of the reducer pass through the elbow-pipe Y into the cylinder G, where the heavier oils are condensed, and pass through the trap-pipe Y' into the receiver $W^2$. The vapors which are not condensed in the cylinder G pass into the interior pipe, G', through the open ends thereof, and thence through the pipe G'' into the cylinder H, the steam from the pipes Z creating a draft through the pipes, and so on through the pipe H', cylinder I, pipe I', and pipe K, the vapors which are condensed in the cylinders passing through the trap-pipes and cooler into the tanks $W^3$ $W^4$, and the vapors which pass off through the pipe K, being condensed by the cooler J, are discharged into the tank $W^5$, together with the water resulting from the steam-jets. As the oils pass through the traps in the conduit-pipes, the paraffine, tar, and other deleterious matter are deposited therein, from which they may be removed through the gage-cocks.

If it is desired to further reduce any or all of the products of the foregoing operation, they are pumped from the receiving-tanks into the tank A, through the pipe R, by the pump S.

This form of my improved apparatus is especially adapted for refining, reducing, and separating crude petroleum, which contains a large percentage of tar, paraffine, and other heavy matter.

The advantages of my invention are that by means of the apparatus described the oil is removed from the reducing-heat as soon as the reduction is effected. The separation of the distillates is continuous and complete, and impure and foreign matter is removed from the oil without discoloration, injury, or waste.

Although I have described the separator as connected with certain devices for distilling and reducing the oil, I do not desire to limit its use to such devices.

Having thus described my invention, what I claim, and desire to secure by Letters Patent, is—

1. In apparatus for refining, reducing, and separating hydrocarbon and other oils, a separator consisting of a series of cylinders, each having an interior pipe open at one or both ends, the interior pipe of one cylinder communicating with the shell of the next cylinder, traps leading from the bottom of the cylinders, and steam-jet pipes opening into the open end or ends of the interior pipes, substantially as and for the purpose specified.

2. In apparatus for refining, reducing, and separating hydrocarbon oils, a separator consisting of a series of cylinders, each having an interior open-ended cylinder which communicates with the shell of the next cylinder, and trap-pipes leading from the several cylinders, substantially as and for the purposes specified.

In testimony whereof I have hereunto set my hand this 12th day of October, A. D. 1883.

EBENEZER W. STRAIN.

Witnesses:
JAMES K. BAKEWELL,
W. B. CORWIN.